Feb. 4, 1941.   C. A. HALL   2,230,976
PROCESS OF MAKING STORAGE BATTERY PLATES
Filed Feb. 25, 1939

WITNESS:
Rob R Mitchel

INVENTOR
Clarence A. Hall,
by
Augustus B. Stoughton
ATTORNEY.

Patented Feb. 4, 1941

2,230,976

UNITED STATES PATENT OFFICE 2,230,976

PROCESS OF MAKING STORAGE BATTERY PLATES

Clarence A. Hall, Philadelphia, Pa., assignor to The Electric Storage Battery Company, Philadelphia, Pa., a corporation of New Jersey Application February 25, 1939, Serial No. 258,487

1 Claim. (Cl. 136—55)

The present invention relates to storage battery plates having pencils of active material in which are embedded metallic spines or rods and which are arranged in parallel relation and are connected usually by heat fusion to top and bottom metal bars and which pencils are covered with porous glass wool sheathing; and in such plates the spines or rods are sometimes provided with thin and relatively widely spaced annular spacing members projecting therefrom and the active material fills the space between the spacing members or flanges, and the active material as well as the flanges are enclosed in the sheathing.

The principal objects of the present inventions are to provide an efficient, comparatively inexpensive, and satisfactory method of manufacturing such plates at a reasonable cost.

Another object of the present invention is to satisfactorily oppose the shedding of fine particles of active material from the plate as well as to maintain good electrical contact between the active material and the spines.

Other objects of the invention will appear from the following description at the end of which the invention will be claimed.

Generally stated, the invention consists in producing a sheathing for the pencils and spines of such plates which comprises superposed layers or tubes of reticulated glass wool fabric fabricated on the active material in which is embedded the spines and, therefore, well adapted to maintain good electrical contact between the active material and the spines and also adapted by the tortuous nature and relatively small dimension of the pores or openings to retain any active material that may become detached from the pencils so that it may not escape into the electrolyte.

The invention also comprises fabricating a continuous tube of porous glass wool fabric, inserting pencils of active material in which are embedded metal spines one after another into said continuous tube as it is fabricated, cutting the tube between the pencils and assembling the individual units into the plate.

The invention also comprises the improvements to be presently described and finally claimed.

In the following description reference will be made to the accompanying drawing forming part hereof and in which, Figure 1 is a side view with parts broken away of a plate embodying features of the invention.

Figure 1:
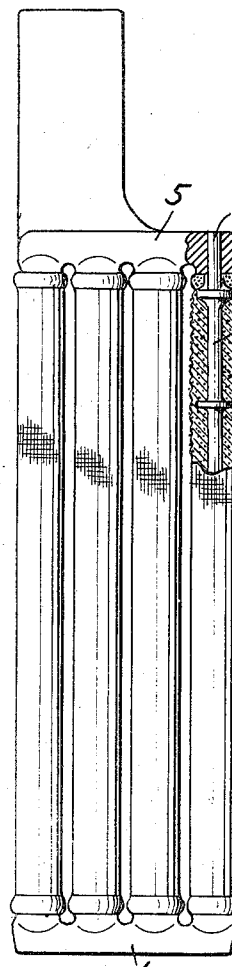

Referring to the drawing, and more particularly to Figure 1, there are a multiplicity of horizontally spaced parallel and vertically extending rods 1. Each rod is shown as having a series of thin and relatively widely spaced annular spacing members 2 projecting therefrom. 3 is a porous glass sheathing enclosing each of the rods 1 and the spacing members thereon. 4 indicates active material filling the spaces between the members 2 and enclosed in the sheathing around each of the rods and divided into a multiplicity of separate bodies by the flanges. The sheathing consists of glass filaments interwoven on the active material or pencils (as they are sometimes called) and being under predetermined tension, thereby ensuring good electrical contact between the rods or spines and the active material. 5 and 6 are top and bottom bars connecting the rods into a group. 7 is a collar which draws the sheathing inward at the end of the active material and onto the end of the spine or rod which projects beyond the active material. The collar 7 is arranged close up to the top bar 5 and to the end of the active material. The collar may be made of material inert to battery action and of which rubber is one, but by no means the only example.

Figures 3, 4:
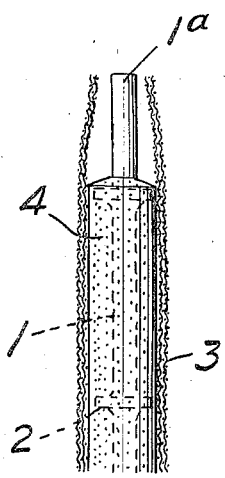
Figure 3 is a view partly in section illustrating a step in the method.
Figure 4 is a similar view illustrating another step in the method.

According to the present invention the threads or glass filaments of the sheathing are interwoven on the pencils and are under predetermined tension and thus good electrical contact between the spines and the pencils is insured. In some cases the casing is of one ply and in other cases it is of more than one ply, as shown in Figs. 3 and 4, and since the plies are reticulated by knitting or braiding either or both of them it follows that the pores through them are not only small but relatively tortuous and in this way the escape of fine particles of active material that may become detached through the casing to the interior of the battery is opposed. Since the sheathing is fabricated on the pencils of active material it follows that the tension of the threads may be predetermined in manufacture. By the described construction the tension of the outside tube may be adjusted in such a way as to firmly attach it to the inside tube which, of course, is properly mounted on the pencil of active material. The spacing members 2, when present, serve to divide the active material or pencil into a multiplicity of separate bodies. Therefore, in the event of an accident the effect of it is localized. Furthermore, the spacers are useful in the application of the active material to the rods or spines since the active material may be applied in a mold and then drawn out of the mold in place on the spine. The ends of the rods which project beyond the pencils of active material may be connected with the top and bottom bars by heat fusion.

Figure 2:
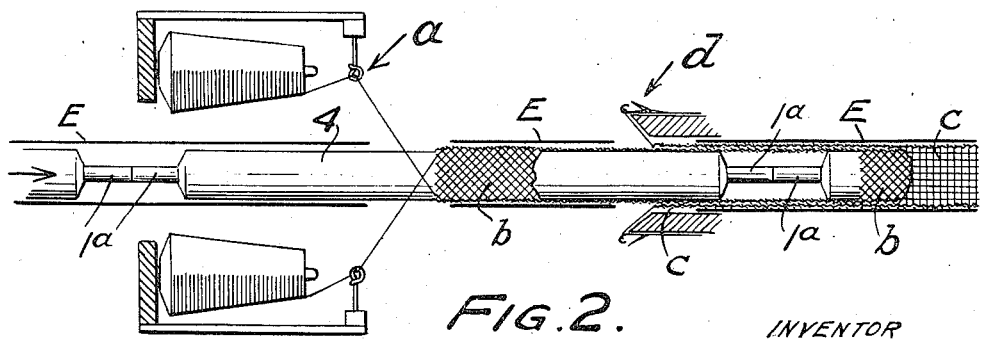
Figure 2 is a diagrammatic view illustrative of the method employed in making the plates.

According to the present invention the described plate may be manufactured as follows and a description will be given in connection with sheathing comprising superposed tubes but, of course, one of them may be omitted. A continuous tube of porous glass wool fabric *b* is made by the braiding machine indicated at *a* in Figure 2, and this tube is made on a pencil *1* of active material in which is embedded a spine, the ends *1a* of which project beyond the active material. For this purpose pencils of active material are inserted one after another into this continuous tube as it is fabricated or braided. A second tube *c* is continuously fabricated on top of the tube *b* by the knitting machine *d* as it travels toward the right in Figure 2. It may be remarked that the knitting machine may be adapted to produce lock stitches. Both of the superposed tubes may be fabricated on the pencils either by knitting or braiding or by both. The tension of the threads or filaments of glass on the pencil is under control by adjustment of the machine by which it is fabricated. E indicates sections of tubes or other guides by means of which the pencils are guided into and along with the tube or tubes of glass filaments as they are fabricated. The product so far described is a continuous sheathing containing pencils of active material disposed end to end with the projecting end of their spines in contact. The sheathing is then cut so as to provide independent units. Either before or after cutting the collars 7 are applied to the exterior of the sheathing.

It will be obvious to those skilled in the art to which the invention relates that modifications may be made in details of construction and procedure without departing from the spirit of the invention which is not limited in respect to the same or in respect to mere matters of form or otherwise than the appended claim may require.

I claim:

The process of making storage battery plates having pencils of active material in which are embedded metal spines or rods connected to top and bottom metal bars and which pencils are covered with tubular retainers of porous glass wool fabric which consists in continuously fabricating a continuous tube of porous glass wool fabric, inserting pencils of active material in which are embedded metal spines that project from the ends of the active material one after another into said continuous tube as it is fabricated, cutting the tube at the ends of adjacent spines into individual units, enclosing the end portions of the pencil of each unit in the tube by drawing the latter onto the end portions of the spine by the application of a binding member adapted to bind the end of the tube closely against the projecting end of the spine around the tube and spine and near the ends of the pencil, and assembling the units in parallel relation into a complete plate by casting the top and bottom bars onto the ends of the spines and up against the binding members.

CLARENCE A. HALL.